May 15, 1934.  J. S. BEEKLEY  1,959,151
METHOD OF EFFECTING CHEMICAL REACTIONS AT ELEVATED TEMPERATURES
Filed Sept. 30, 1930
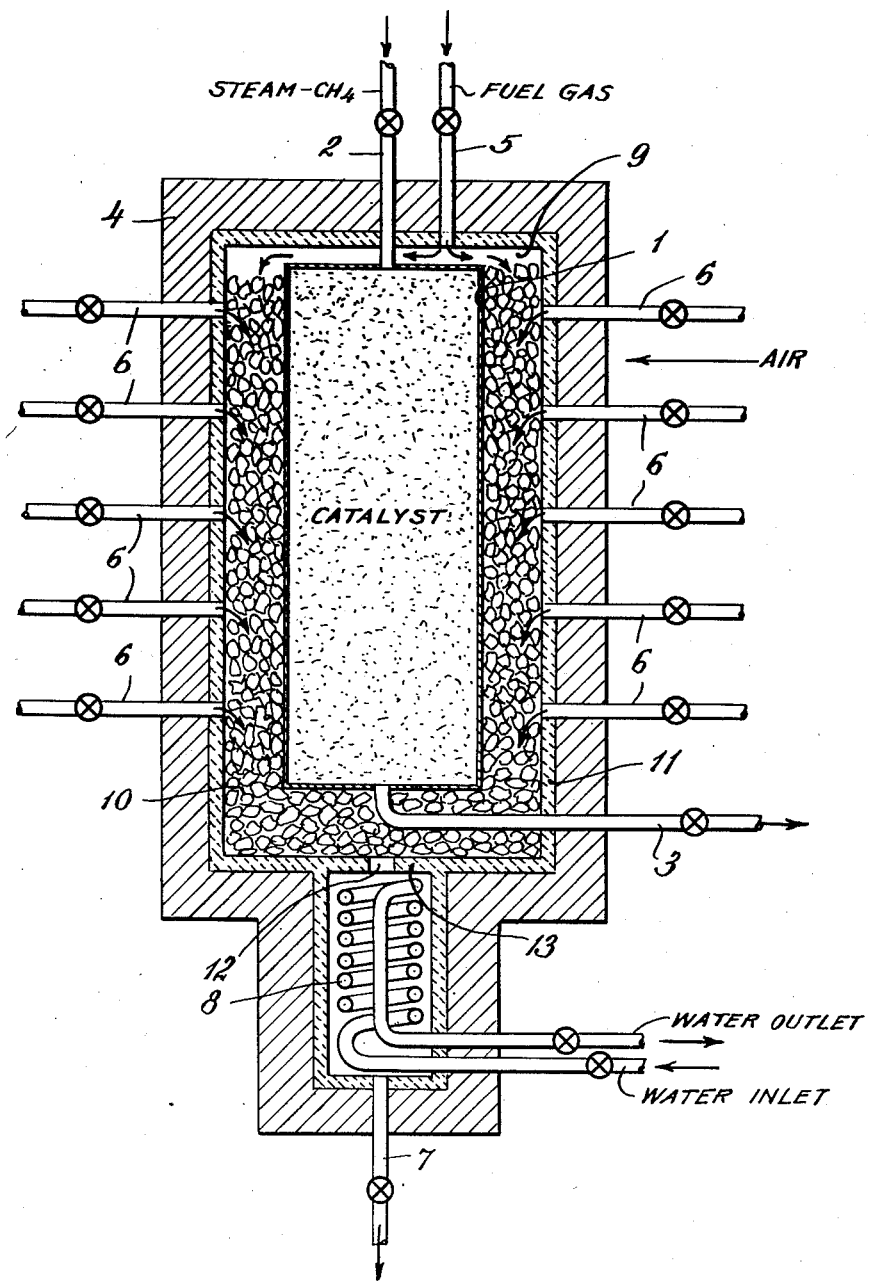
INVENTOR
John S. Beekley,
BY
W. R. Gawthrop
ATTORNEY Patented May 15, 1934

1,959,151

UNITED STATES PATENT OFFICE 1,959,151

METHOD OF EFFECTING CHEMICAL REACTIONS AT ELEVATED TEMPERATURES

John S. Beekley, Charleston, W. Va., assignor, by mesne assignments, to E. I. du Pont de Nemours & Company, Wilmington, Del., a corporation of Delaware Application September 30, 1930, Serial No. 485,414

3 Claims. (Cl. 23—212)

This invention relates to chemical reactions at elevated temperatures and more particularly to a method of and apparatus for conducting such reactions in which heat is supplied by combustion of gas.

It is an object of the present invention to provide an improved process for effecting reactions at high temperatures in which heat is supplied to the reaction by a combustion carried on in heat exchange relation thereto.

It is a further object of the invention to provide an improved process for effecting the reaction of steam and hydrocarbons.

It is also an object of the invention to provide an improved apparatus for carrying out processes of the character referred to.

Other objects and advantages of the invention will be apparent as it is more fully understood by reference to the following specification and to the accompanying drawing in which—

The figure is a diagrammatic representation of an apparatus suitable for the practice of the invention, particularly as applied to manufacture of hydrogen by reaction of steam and hydrocarbons under elevated temperatures and pressures. In the drawing (1) is a reaction chamber provided with an inlet (2) for introduction of the materials that are to react and an outlet (3) for withdrawal of products of the reaction; chamber (1) is enclosed within a metallic pressure-sustaining shell or wall (4) which is spaced therefrom to form a combustion chamber (9) in which inlets (5) and (6) serve for admission of the combustion reactants and outlet (7) for withdrawal of the combustion products. (8) is a cooling coil by means of which combustion products are cooled before withdrawal from the apparatus.

In accordance with the present invention, in chemical reactions effected at elevated temperatures, heat is supplied by a progressive and regulated combustion in heat exchange relation to but out of actual contact with materials undergoing reaction. This combustion is effected by introducing to a combustion zone, which is in heat exchange relation to the reaction zone, the greater part of one of the combustion reactants, i. e. for example either the fuel gas or the air or other oxygen-containing gas, and thereafter adding at least a greater part of the other combustion reactant in separate portions at various points in the combustion zone. The rate of combustion, and therefore the amount of heat developed in the combustion, may thus be controlled by adjusting the rate of addition of the second combustion reactant to the several points in the combustion zone.

This method of working is particularly advantageous in the case of markedly endothermic reactions conducted at very elevated temperatures, as, for example, the manufacture of hydrogen from steam and hydrocarbons, especially if, as is sometimes the case, the reaction in question is to be conducted under elevated pressures. The particular advantage in such cases arises from the difficulty of securing suitable materials of construction for the reaction apparatus, these difficulties being the greater the higher the temperature and pressure to be employed.

Let it be assumed, for example, that hydrogen is to be made by the catalytic reaction of steam and gaseous hydrocarbons under such conditions that the reactants are delivered to the catalyst at a temperature of, say, 500° C., and are to be withdrawn from the catalyst after the endothermic reaction at a temperature of 600°, this latter temperature being, in the case assumed, necessary to establish the equilibrium corresponding to the desired composition of gaseous products. In such a case if the external heating by combustion is effected in the usual manner by burning fuel gas and conducting the hot flue gas around the main reaction chamber, it will obviously be necessary that that fuel gas be at a temperature considerably in excess, perhaps as much as 200°, of the maximum temperature in the main reaction zone. Such conditions place severe requirements upon the material of which the main reaction chamber is constructed, particularly if that reaction is conducted under high pressures. If, on the other hand, the improved process herein described is employed, it is never necessary for the combustion gases to attain a temperature very greatly in excess of the main reaction temperature, the controlled addition of one of the combustion reactants in stages making it possible to generate in the combustion chamber and, therefore, deliver to the main reaction chamber, such amounts of heat as may be required in the several zones thereof and, if necessary, to control the same from time to time as conditions may require.

A further feature of the invention in its preferred form, particularly as applied to reactions such as that of steam and hydrocarbons under pressure, is the operation of the combustion under elevated pressures. This method of working has the advantage that, presumably because of the higher mass velocity of the gases in the combustion chamber, a considerably more efficient heating of the main reaction zone is effected. In fact, a rate of heat transfer may be attained which under other conditions would be possible only at much higher temperatures. Furthermore, surrounding the main reaction chamber with combustion gases under elevated pressure reduces the pressure to which the walls of the main reaction chamber are subjected and, therefore, reduces the possibility of rupture thereof.

An additional feature of the invention relates to the fact that when operating the process under pressure a practical difficulty is encountered in handling the hot, compressed combustion products in conduits exteriorly of the reaction apparatus. To obviate this difficulty I provide means for cooling the combustion gases before they leave the apparatus and preferably I employ water as the cooling agent, which is thereby heated to form steam and the latter, in the case of the steam: hydrocarbon process, is then utilized to supply at least a part of the steam required therefor.

For purposes of indicating more fully how the invention may be practised, the following example is given in which the invention is described in its preferred form as applied to manufacture of hydrogen from a gaseous mixture of steam and methane. It is to be understood that the example is provided only by way of illustration and that the process described may be varied widely, particularly as to the specific reaction which is to be effected and the details of apparatus and operating conditions employed.

Referring to the drawing, a gaseous mixture of steam and methane at a pressure of 15 atmospheres and preferably preheated by heat exchange with hot products from the reaction of similar gases, is admitted to the apparatus through the conduit (2) whence it traverses the reaction chamber (1), which, particularly if reaction temperatures lower than 1000° C. are to be employed, should contain one of the known catalysts for the reaction of steam and methane. If, however, no catalyst is employed, the chamber (1) may be filled with pieces of suitable refractory material. The products of the reaction leave the apparatus by way of the conduit (3) and after heat exchange with fresh gases going to the conduit (2), may be subjected to suitable methods for the separation of the oxides of carbon and any unconverted steam and methane. Fuel gas, combustion of which provides the necessary heat for the hydrogen-making reaction, is introduced through the inlet (5) and air through valved inlets (6), which latter are disposed at convenient intervals along the pressure-sustaining wall (4) in the path of the gases passing through the combustion chamber. Both fuel gas and air are introduced at a pressure of about 10 atmospheres. Either the fuel gas or the air, or both, may, if desired, be preheated before introduction into the apparatus, for example, by heat interchange with the products of combustion leaving the apparatus. The combustion (which may be initiated in any convenient manner as, for instance, by means of a spark plug, not shown, in the pressure-sustaining wall), is regulated, particularly with respect to the amount of heat delivered to various zones of the reaction chamber (1), by suitably setting the valves controlling the flow of air through inlets (6). For the purpose of improving the efficiency of the combustion, the combustion chamber (9) may be provided with baffles, not shown, or filled with pieces of refractory material (10), preferably having more or less catalytic activity in promoting the reaction of oxygen with the fuel gas. The combustion products, after heating the reaction chamber (1), are withdrawn through the orifice (12) in the refractory shield (13) to the lower part of the apparatus in which they pass over the cooling coil (8). This latter serves the double function of lowering the temperature so that they may more safely be handled exteriorly of the apparatus and also of generating steam which is utilized to provide at least part of the steam for the steam-methane mixture introduced through inlet (2). The combustion products finally leave the apparatus through the outlet (7).

In addition to the refractory material (11) with which the pressure-sustaining wall (4) is lined, it may be advantageous, especially when working at very elevated temperatures to include between the wall (4) and the lining (11) another insulating material, not necessarily of the refractory type. Also, for protection of the wall, it may be desirable to use a water jacket either just inside or just outside thereof.

As previously indicated, it is possible to add either of the combustion reactants at commencement of the combustion and the other in portions during the course thereof. Furthermore, while generally speaking it will be desired not to mix the combustion reactants before introduction to the combustion chamber, in some cases it may be found advantageous to include some air with the fuel gas and/or some fuel gas with the air, it being sufficient for the purpose of the invention that at least the major part of one of the combustion reactants be introduced at the commencement, and at least the major part of the other in separate portions during the progress of the combustion. It is also to be understood that, while the invention is particularly useful in the reaction of hydrocarbons and steam at elevated pressures, say within the range of 5–50 atmospheres, it may be applied with advantage to a variety of chemical reactions effected at elevated temperatures.

Various changes may be made in the method and apparatus described without departing from the invention or sacrificing any of the advantages thereof.

I claim:

1. A process for effecting reaction of steam and a hydrocarbon, which comprises supplying heat to the reaction by continuously passing burning fuel gas in heat exchange relation to but out of direct contact with the reacting steam and hydrocarbon, and thereafter removing residual heat from the combustion products by heat exchange with water, thereby generating steam and using said steam in the steam-hydrocarbon reaction.

2. A process for effecting reactions of steam and hydrocarbons, in which heat is supplied to the reaction by continuously burning a fuel gas with an oxygen-containing gas in heat exchange proximity thereto, substantially all of the fuel gas being introduced at the commencement of the combustion and substantially all of the oxygen-containing gas being introduced in controlled portions at certain stages of the combustion, which includes the step of thereafter removing residual heat from the combustion product by heat exchange with water, thereby generating steam and using said steam in the steam-hydrocarbon reaction.

3. A process for effecting reactions of steam and methane, in which heat is supplied to the reaction by continuously burning a fuel gas with an oxygen-containing gas in heat exchange proximity thereto, substantially all of the fuel gas being introduced at the commencement of the combustion and substantially all of the oxygen-containing gas being introduced in controlled portions at certain stages of the combustion which includes supplying heat to the reaction by continuously passing burning fuel gas in heat exchange relation to but out of direct contact with the reacting steam and methane, and thereafter removing residual heat from the combustion products by heat exchange with water.

JOHN S. BEEKLEY.